UNITED STATES PATENT OFFICE 2,389,229

ANTIFOULING COMPOSITION

George H. Young, Pittsburgh, Pa., assignor to Stoner-Mudge, Inc., Pittsburgh, Pa., a corporation of Pennsylvania No Drawing. Application June 5, 1941,
Serial No. 396,754

2 Claims. (Cl. 106—15)

This invention relates to antifouling compositions capable of application to the surfaces of structures which are subjected to submersion in sea water, for the purpose of preventing fouling by *Cirripedes crustacea* (barnacles), hydroids, Bryozoa, and other marine organisms. It relates specifically to antifouling coating materials including in their composition the undissociable toxic condensation products derived from certain aromatic hydrocarbons and substituted hydrocarbons, and mercury salts, as hereinafter fully set forth. My antifouling compositions find particular application in the protection from fouling of metal structures such as ship hulls, pier supports, and flying boat hulls and pontoons, where use of prior-art antifouling paints containing ionizable heavy metal compounds results in deleterious galvanic corrosion due to the electrochemical activity of dissimilar metals in contact. It will, however, be understood that they are equally applicable to nonmetallic surfaces.

In United States Patent 2,287,218 issued June 23, 1942, of which I am a co-inventor, there were described effective antifouling compositions consisting of "mixtures of certain phenolic compounds, certain high boiling coal tar bases, and aromatic unsaturated aldehydes, dispersed in suitable film-forming vehicles and volatile solvents." In a second application, filed March 25, 1941, Serial No. 385,079, I described another type of organic toxic agent which was a "primary condensation product derived from certain phenolic bodies and certain aldehydes."

I have now experimented further, and have discovered that certain undissociable aromatic mercurials, resulting from the condensation of certain aromatic compounds with mercuric salts are unexpectedly and strongly active against marine organisms generally, and particularly against algae, *Cirripedes crustacea* and Bryozoa. In certain applications these condensation products are more strongly lethal to marine arthropods than are the compositions of my previous invention. The reason for this superiority is not known. It may reside in the fact that the organic mercurials are appreciably less volatile than the simple toxic organic bodies from which they are derived and are thus less subject to gradual loss from the painted surface on continued exposure to the atmosphere when the surface is unavoidably out of contact with water. It may reside in a slightly increased water solubility, enabling lethal concentrations to be more rapidly established at the water-coating interface. It may be that the organo-mercury complexes are themselves specifically more lethal than the parent organic compounds from which they are derived. Whatever the mechanism whereby they operate, antifouling coatings containing these organo-mercury condensation products are particularly effective, and surpass in protective ability even those prior art compositions containing large amounts of inorganic copper and mercury compounds.

Not all organic compounds are capable of condensation with mercury, as is well known. I have found that suitable antifouling toxic agents can be prepared from aromatic hydrocarbons and substituted hydrocarbons which have at least two reaction-favorable positions available in the parent benzene ring. By this, I mean that those aromatic bodies having the structures

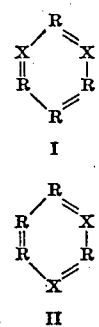

will serve my purpose. In these schematic formulae, X is hydrogen, and R is either hydrogen or any alkyl, aryl, alicyclic, or halogen-substituted alkyl, aryl or alicyclic radical; or R may be a halogen or a hydroxyl group. In general, I prefer as the aromatic component of my toxic condensation product the lower alkyl, aryl, and alicyclic substituted benzene hydrocarbons, and their hydroxy and halogenated derivatives. By "lower," I mean that the substituting radicals may be methyl, ethyl, propyl, butyl and higher alkyl radicals containing up to 6 carbon atoms; and I mean to include the cyclobutyl, cyclopentyl, and cyclohexyl radicals; and I mean to include the phenyl radical. By specifying "their hydroxy and halogenated derivatives" it will be understood that I mean to include derivatives containing halogen and/or hydroxy groups in either the parent benzene ring, in the substituting radicals, or in both.

Typical aromatic bodies which may be advantageously employed in the preparation of my toxic organo-mercuric condensation products are tabulated below:

Benzene
o-Cresol
o-Tert. butyl phenol
o-Tert. amyl phenol
o-Cyclohexyl phenol
Crude chlorinated cresols (mixed)
2,3-dichlorophenol
2,5-dichlorophenol
Toluene
2-chloro-o-phenyl phenol
p-Cresol
p-Tert. butyl phenol
p-Tert. amyl phenol
p-Cyclohexyl phenol
Crude chlorinated xylenols (mixed)
o,p-Cresols (crude cut)
2,3,4-trichlorophenol
2,4,5-trichlorophenol
p-Cumyl phenol
2-bromo-o-phenyl phenol
Crude brominated cresols (mixed)
Crude brominated xylenols (mixed)
Mixed xylenols (crude cut)

The preparation of my toxic organo-mercurials offers little difficulty; they are well known compounds usually encountered in highly purified form in the pharmaceutical field (a non-analogous use). Thus (Whitmore, F. C., "Organic Compounds of Mercury," A. C. S. Monograph No. 3 (1921)), they may be derived (1) from nuclear-substituted halo-aromatics and dilute sodium amalgam in the presence of suitable catalysts, (2) from the double salts of aromatic diazonium chlorides and mercuric chloride, (3) by direct mercuration of aromatic compounds using mercuric acetate, (4) from sulfinic acids and mercuric chloride, (5) by diazotization of aromatic amines through the double salt with mercuric chloride, (6) by the action of mercuric salts on various specific types of compounds such as phenyl megnesium bromide, phenyl boric acid, or phenyl arsenoxide.

In the usual processes of preparation, mixtures of mercuri-bis compounds

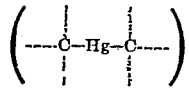

and the mono-metallo linked aryl mercuric salts

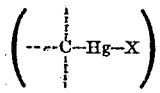

are obtained. For my purposes these complex mixtures are equally as serviceable as are the isolated pure products, so that costs of producing a useable product are not as high as would be ordinarily expected with organo-mercurials for drug and pharmaceutical purposes.

Typical organo-mercuric condensation products which I have found to be effective in my antifouling compositions are phenyl mercuric acetate, di-phenyl mercury, o-hydroxy phenyl mercuric acetate, p-hydroxy phenyl mercuric chloride, di-o-tolyl mercury, di-p-hydroxy phenyl mercury, p-tolyl mercuric acetate, phenyl mercuric hydroxide, o-chlor phenyl mercuric acetate, and p-diphenyl mercuric acetate. In general, I prefer to use the aryl mercuric acetates rather than the mercuri-bis type of compounds; the former are slightly easier to prepare in commercial quantities and their effectiveness against the marine organisms which contribute to fouling is quite satisfactory.

In the choice of suitable resinous vehicles for my toxic organo-mercuric condensation products I am not restricted to the oils and oleoresinous type of materials usually employed in metal-containing antifouling paints. Since my toxic components are soluble in varnish and lacquer solvents, I obtain a film in which the toxic compounds are actually molecularly dispersed. As a result of this I may advantageously employ resinous vehicles having substantially lower water permeabilities than dare be the case with the usual prior art compositions; consequently, my improved antifouling coatings have a substantially longer service life, and are themselves protective against corrosive influences which are destructive to the underlying surface.

I have found that practically any resinous vehicle which yields films permeable to water at a rate of not less than 5 milligrams of water per mil of film thickness per square inch per 24 hours when tested by the free film diffusion-cell method (Wray and Van Horst, "Ind. Eng. Chem." 28, 1268-9 (1936)), will function satisfactorily as the film-forming carrier for my toxic primary condensation products. While there is no fixed upper limit to the permeability of my resinous vehicles, there is manifestly no advantage in employing a vehicle which is so rapidly permeable as to permit the toxic component to be leached out in a short time. I have found that resinous vehicles having permeabilities not greater than 200 milligrams of water per mil of film thickness per square inch per 24 hours are generally adequate for my purpose, though I prefer vehicles of permeability in range of 10 to 130.

I find that the so-called "spar-varnishes" made from phenol-aldehyde resins having oil lengths of 25-50 gallons, the oils being typically linseed, tung, oiticica, or mixtures of these, are excellent carriers for my toxic organo-mercuric condensation products. For certain special applications, as to flying boat hulls and pontoons, it may be advisable for other reasons to employ a varnish or lacquer based on non oil-containing resins of the polyvinyl chloride, polyvinyl chloride-acetate, chlorinated rubber, cellulose ester, polymethyl methacrylate type, or cellulose ether type. I may also advantageously employ as vehicles the resins derived from condensation of polybasic acids with polyhydric alcohols (with or without oil modification), ester gum varnishes, urea-formaldehyde condensation products, cumarone-indene resins, cyclo- and dicyclo-pentadiene resins, and similar resins of the greatest diversity and variety.

For the sake of simplicity I shall throughout the specification and claims refer to these resinous vehicles as "permeable resinous organic film-forming vehicles," and it will be understood that I mean to include any resinous coating material having a permeability rate of 5 to 200 milligrams of water per mil of film thickness per square inch per 24 hours when tested by the previously cited diffusion-cell method.

While my antifouling compositions may advantageously be employed as clear lacquers or varnishes, they may be pigmented in the usual manner with the familiar dyes and pigments. My antifouling compositions containing aluminum powder as pigment are excellent for coating flying boat hulls and pontoons. My antifouling compositions pigmented with zinc dust or with zinc chromate are particularly satisfactory for use on aluminum or magnesium alloys since such pigments are corrosion inhibitors in this case, and the resulting pigmented compositions are equally protective against corrosion and fouling.

There is no fixed limitation upon the amount of toxic component which may be incorporated with the resinous vehicle; there is, however, a practical upper limit in that too great an addition may yield films which are soft, nonadherent, and easily damaged. Similarly, there is a practical lower limit to the amount of toxic component which should be added. Preferably I employ from about 15 to 50% by weight of the toxic component based on the total non-volatile content of the formulation, but the lower limit of 15% is not absolute and indicates the approximate concentration below which a satisfactory compound may not be obtained.

My antifouling compositions are in no wise to be confused with prior art compositions, containing heavy metal inorganic compounds, typically copper oxide and mercuric oxide. The toxicity of these inorganic compounds depends upon their ability to dissociate in water to liberate lethal concentrations of toxic ions. In contrast to this behavior, my compositions do not yield mercuric ions in water. Laboratory experiments conclusively proved that at concentrations even greater than $\frac{1}{1000}$ molal (sufficient to produce death with Daphnia as test animal in less than 15 minutes after contact) there were no free mercury ions present, demonstrated by the fact that no black precipitate could be obtained with ammoniacal hydrogen sulfide, nor could a yellow precipitate be obtained with sodium hydroxide—both of which are sensitive tests for free or dissociated mercury ions. As a result of this undissociable character of my toxic ingredients, my antifouling compositions can be safely employed on active metals, such as aluminum, and magnesium alloys without danger of electrochemical corrosion and pitting due to the galvanic action of dissimilar metals in contact. Thus, my compositions are particularly applicable to aircraft pontoons and the like, where prior art compositions containing inorganic mercury and copper compounds may not be used without danger of galvanic corrosion.

The following examples will serve to illustrate my invention, it being understood that I am not limited to the specific materials there described, nor to the specific compositions given.

*Example 1*

40% ester gum varnish solids
    25 gallon oil length containing:
        50% tung oil
        50% linseed oil
10% phenyl mercuric acetate
50% mixed solvent consisting of:
    60% xylol
    10% dipentene
    30% mineral spirits This preparation was applied as a clear varnish.

*Example 2*

15% medium viscosity ethyl cellulose
5% di-o-tolyl mercury
80% mixed solvent consisting of:
    50% butyl acetate
    30% methyl isobutyl ketone
    20% xylol This composition was pigmented with 1½ pounds per gallon of aluminum powder.

*Example 3*

35% phenolic varnish solids
    33 gallon oil length on Bakelite BR-254
    (a p-phenyl phenol-formaldehyde oil soluble resin)
        60% tung oil
        40% linseed oil
15% p-hydroxy phenyl mercuric chloride
50% mixed solvent consisting of:
    80% mineral spirits
    10% xylol
    10% dipentene The above clear toxic-containing vehicle was pigmented with an 80/20 mixture of zinc dust and zinc oxide at a pigment-to-varnish ratio of 75/25, all figures by weight.

*Example 4*

35% varnish solids
    25% 33 gallon oil length on Bakelite BR-1329
    (an alkyl phenol-formaldehyde oil soluble resin)
        100% tung oil
    10% polyhydric alcohol-polybasic acid resin modified with linseed oil (Rezyl 869)
15% o-cresyl mercuric acetate
50% mixed solvent consisting of:
    80% mineral spirits
    10% xylol
    10% dipentene The above clear toxic-containing vehicle was pigmented with 1½ pounds per gallon of aluminum paste.

And now, having described my invention and having shown the advantages attendant on its use, I claim as my invention:

1. An antifouling composition for application to surfaces subjected to immersion in sea water and adapted to prevent the attachment thereto of fouling marine organisms while exerting a protective non-corroding action on said surfaces, said composition comprising as the sole film-forming agent a substantially water-insoluble, solvent-dispersed, film-forming organic vehicle having a permeability to water of 5 to 200 milligrams of water per mil of film thickness per square inch per 24 hours, and a toxic component which is a condensation product of a mercuric salt and an aromatic compound selected from a group consisting of benzene and the lower alkyl, aryl, and alicyclic-substituted benzene hydrocarbons, together with their hydroxy and halogenated derivatives, the concentration of toxic component being approximately 15 to 50% by weight of the total non-volatile content.

2. The composition of claim 1, in which the water permeability of the said substantially water-insolube film-forming vehicle is in the range of about 10 to 130 milligrams of water per mil of film thickness per square inch per 24 hours when tested by the free film diffusion cell method.

GEORGE H. YOUNG.

Certificate of Correction

Patent No. 2,389,229.  November 20, 1945.

GEORGE H. YOUNG

It is hereby certified that error appears in the printed specification of the above numbered patent requiring correction as follows: Page 1, second column, lines 19 to 32, inclusive, strike out

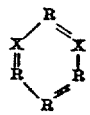

I and

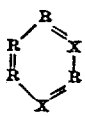

II and insert instead, the following—

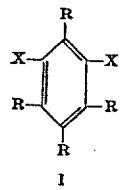 and 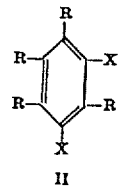

I  II and that the said Letters Patent should be read with this correction therein that the same may conform to the record of the case in the Patent Office.

Signed and sealed this 19th day of February, A. D. 1946.

[SEAL]

LESLIE FRAZER,
*First Assistant Commissioner of Patents.*